April 12, 1955  E. RIEDEL  2,706,048
SCREENS FOR SETTLING AND SCREENING INSTALLATIONS
Filed Oct. 12, 1951  2 Sheets-Sheet 1
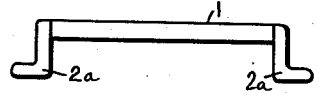
Fig 1
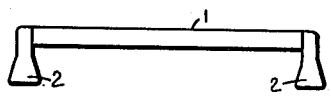
Fig 2
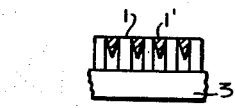
Fig 4
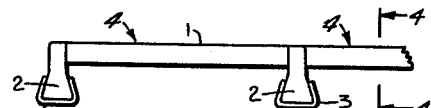
Fig 3
Fig 5
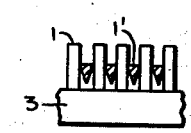
Fig 7
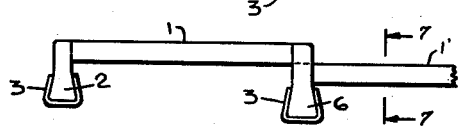
Fig 6
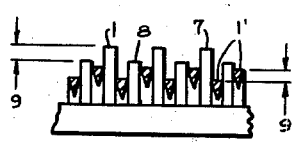
Fig 9
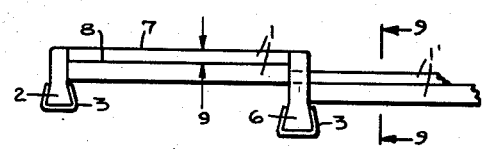
Fig 8
Fig 11
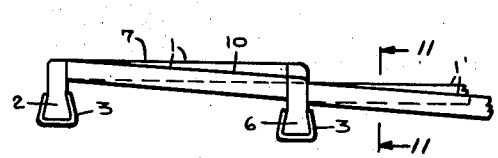
Fig 10
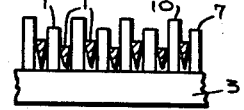
Fig 13
Fig 12
INVENTOR.
ERICH RIEDEL
BY
ATTORNEY

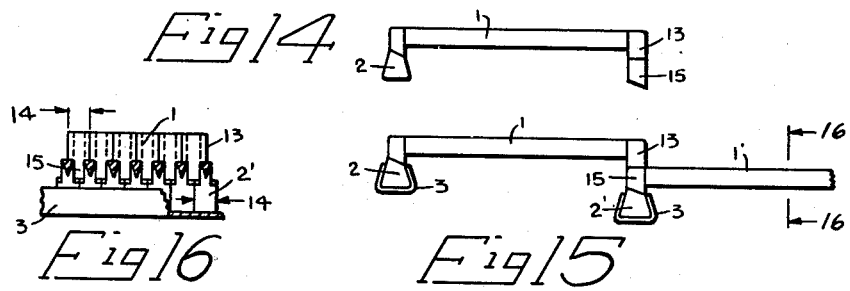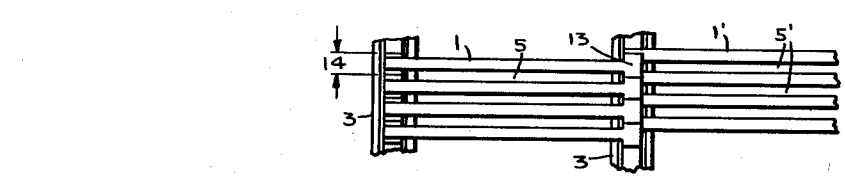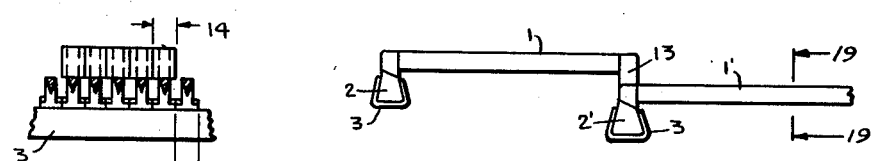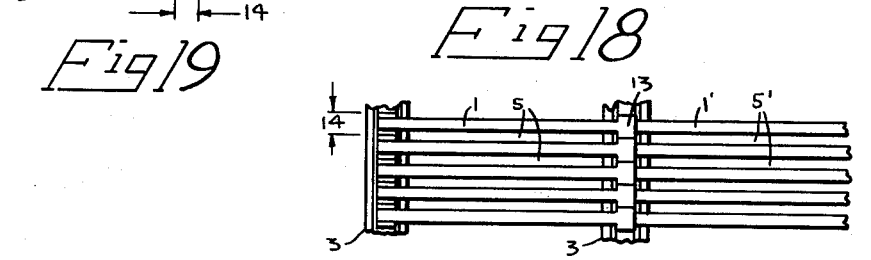
INVENTOR.
ERICH RIEDEL
ATTORNEY

United States Patent Office 2,706,048
Patented Apr. 12, 1955

2,706,048

SCREENS FOR SETTLING AND SCREENING INSTALLATIONS

Erich Riedel, Dusseldorf, Germany

Application October 12, 1951, Serial No. 251,019

Claims priority, application Germany October 14, 1950

2 Claims. (Cl. 209—395)

The invention relates to screens for settling and screening installations.

The bottom screens or screen bottoms used in settling and screening installations are often made of a plurality of adjacent profiled wires extending in the longitudinal direction of the screens, being twisted into ears and fixed onto cross bars.

The wires are greatly strained during the manufacture of these screens by the twisting step; hard wires cannot be bent at all into small ears. Moreover, by the twisted portions being located at the crossings of the entering and the emerging wire ends, undesired accumulations result of the materials to be screened. The twisting of the wires also makes it impossible to use profiles having a high web, because the latter cannot be twisted. Finally, the manufacture of the screens from twisted wires is expensive and time consuming, because the entering of the cross rods into the loops must be done by hand.

It is the main object of the invention to eliminate the above recited disadvantages and shortcomings in the manufacture of screens for settling and similar purposes.

With this object in view, the throughgoing circular rods and the twisting thereof into ears are replaced by lamellae extending in the longitudinal direction of the screens, the said lamellae being adjacently and successively arranged. Therefore, the screen bottom constructed in conformity with this invention is not composed of circular rods or wires extending over the entire screening plane, but it is composed of a plurality of webs denoted in the following as "lamellae" which at one or both of its ends are bent into supporting legs; these lamellae are combined into screen sections by transverse members secured to the legs in such a manner that gaps or slots of a desired width are created between the lamellae; any desired number of these screen sections may be combined to form the final or bottom screen.

This screen structure enables the replacement of circular wires by web-shaped lamellae having a high abrasion resistance and small width, whereby a considerable increase is secured of the flow area of the screen bottoms. Moreover, it must be kept in mind that the manufacture of these screen bottoms from several lamellae may be effected by automatic machines in a particularly economical manner.

The invention is by way of example illustrated in the accompanying drawings without however, in any way, restricting the same to the shown embodiments.

In the drawings

Figs. 1 and 2 are side views of a lamellae for use in conformity with the invention;

Figs. 3, 4, 5 are a side view, a cross section along 4—4 of Fig. 3 and a top view of a screen bottom constructed from the lamellae shown in Figs. 1 and 2;

Figs. 6, 8, 10, 12 are side views of a further modification of the screen bottom constructed in accordance with the invention;

Figs. 7, 9, 11, 13 are vertical sectional views along lines 7—7, 9—9, 11—11 and 13—13 of Figs. 6, 8, 10, 12;

Fig. 14 is a side view of a further modification of a lamella;

Figs. 15, 16, 17 are a side view, a cross-section on line 16—16 of Fig. 15 and a plan view; and Figs. 18, 19, 20 are a side view, a cross-section on line 19—19 and a plan view of two further embodiments of the invention.

The lamellae forming the main element of the screens consist of a web, preferably having a rectangular or a triangular cross-section, and being provided, see Figs. 1 and 2, at both ends with supporting legs 2. These legs may be Z-shaped, as apparent from Fig. 1, or they may have a somewhat triangular shape, as shown in Fig. 2.

The screen bottom sections 4 are composed of a plurality of these lamellae, which in conformity with the width and the length of the screen may be adjacently or consecutively disposed, as shown in Figs. 4 and 5. For manufacturing purposes, legs 2 are inserted into rails 3 and solidly connected therewith by rolling, welding and the like. The lamellae 1 and 1' form the individual sections of the screen bottom 4; slots or gaps 5 are provided between the individual lamellae.

In conformity with Fig. 5, the lamellae 1' of a consecutive screen section 4 are inserted between the ends of the lamellae 1 of a preceding section. In this manner, a screen bottom results of which the slots are displaced similarly to a chess board; this structure has the great advantage over customary screen bottoms consisting of throughgoing profiles that the individual particles of the masses to be screened are exposed to the scanning action of the screen slots.

In conformity with Fig. 5, the lamellae including their leg supports have an equal width. The width of the screen slots may be varied by a change of the width of the legs. A similar effect may be attained by applying, for instance, welding projections on the legs 2.

Screen bottoms as described above, enable a far-reaching variation of the screening surface and the screens may be well adapted to individual operative requirements.

The step-shape of the screen bottoms has proved to be of particular advantage, because with such screens the individual portions of the charged materials are continuously regrouped and their mutual position is changed. This step-shaped formation of the screen bottoms is realized in conformity with the structures shown in Figs. 6 and 7; the legs 2, 6 of each lamella of one screen are combined within one and the same holder rail 3 with the shorter legs 2 of the lamellae of the consecutive screen section.

Moreover, it was found that the operative capacity of the screen bottoms may be improved and particularly their life greatly extended by a height displacement within each screen section of the webs of the individual adjacent lamellae. Such screen is illustrated in Figs. 8 and 9, where the screen surface forming edges 7, 8 of the lamellae webs 1, 1' are located at a different height. This object is attained in a simple manner by lengthening or shortening the legs 2, 6 of the adjacent lamallae as shown in Fig. 9.

In the Figs. 10–13, two embodiments of the instant screen bottoms are shown, where the lamellae of the one screen section extend in a horizontal and the lamellae of a second screen section in an inclined direction. As shown in the drawing, an inclined lamella 10 follows a horizontal lamella 7. The inclination of the lamellae is effected by a length variation of the legs; moreover, and as shown in Figs. 12 and 13, this object may also be accomplished by a change of the height of the webs or by a combination of both of these measures; with these screen bottoms the width of the slots increases in the direction from the legs 2 towards the legs 6; this width increase of the screen slots is particularly advantageous if lamellae having a triangular cross-section are used; the danger of a clogging of the screens is thereby greatly reduced.

In the embodiments of the invention shown in Figs. 14–20 the lamellae are only provided with legs at their one end; the lamellae consist here of web portions 1 and 1', which at the one end have a head 13. The adjacently located lamellae are grouped with their legs 2 in the rails 3. Leg 2 and head 13 of each lamella are widened relative to the web for a distance 14, see Fig. 16, and adjacent webs of the lamellae are separated by gaps 5 and 5'.

By superposing a series of these screen sections with their head portions upon the ends 2' of the consecutive screen sections step-shaped screen bottoms result, see Figs. 1, 5, 18, similar to those shown in Figs. 6 and 7. The height of the steps may be varied by a different height of the head portions.

With the lamellae shown in Figs. 15–17, nose-shaped extensions 15 are applied to the head portions 13, Fig. 14; the lamellae enter with these extensions 15 into the gaps 5' of the successive screen section. These noses may be widened to such an extent that they are solidly clamped by the ends of the lamellae of the consecutive screen section. By the entrance of the noses 15 into the screen gaps or slots of the consecutive screen sections, screen bottoms result which are provided with checkered screen slots, Fig. 17.

By the omission of the noses screen bottoms are obtained where the screen slots 5, 5' of successive screen sections are mutually displaced or extended substantially rectilinearly in the longitudinal direction of the screens.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. A settling and screening device of the type which is composed of a plurality of longitudinally extending successive screens provided with spaced lamellae extending in the longitudinal screen direction, said device comprising horizontal lamellae having at their ends downwardly enlarged triangular legs, U-shaped rails transversely extending to the longitudinal direction of said lamellae shaped in conformity with said legs and tightly embracing the same, said rails being throughout their angularly enlarged portions solidly united with said legs.

2. A settling and screening device of the type which is composed of a plurality of longitudinally extending successive screens provided with spaced lamellae extending in the longitudinal screen direction, said device comprising horizontal lamellae having at their ends downwardly enlarged triangular legs, U-shaped rails transversely extending to the longitudinal direction of said lamellae shaped in conformity with said legs and tightly embracing the same, said rails being throughout their angularly enlarged portions solidly united with said legs, and said successively disposed screens being located in a mutually offset location.

References Cited in the file of this patent

UNITED STATES PATENTS

| | | |
|---|---|---|
| 85,470 | Murray | Dec. 29, 1868 |
| 327,050 | Wulfert | Sept. 29, 1885 |
| 444,252 | Palm | Jan. 6, 1891 |
| 647,399 | Geske et al. | Apr. 10, 1900 |
| 703,683 | Vrooman | July 1, 1902 |
| 798,382 | Allard | Aug. 29, 1905 |
| 1,187,238 | Beaumont | June 13, 1916 |
| 1,275,713 | McKee | Aug. 13, 1918 |
| 2,320,988 | Wathen | June 8, 1943 |
| 2,465,559 | Urban | Mar. 29, 1949 |
| 2,636,607 | Roubal | Apr. 28, 1953 |

FOREIGN PATENTS

| | | |
|---|---|---|
| 18,684 | Great Britain | Sept. 15, 1899 |
| 318,839 | Germany | Feb. 18, 1920 |